United States Patent
Herbstritt

(12)
(10) Patent No.: US 8,561,329 B1
(45) Date of Patent: Oct. 22, 2013

(54) ROTATIONAL DISPLAYS

(76) Inventor: Roger Herbstritt, Cross Junction, VA (US)

( * ) Notice: Subject to any disclaimer, the term of this patent is extended or adjusted under 35 U.S.C. 154(b) by 30 days.

(21) Appl. No.: 12/970,598

(22) Filed: Dec. 16, 2010

Related U.S. Application Data

(62) Division of application No. 12/368,706, filed on Feb. 10, 2009, now Pat. No. 7,874,089.

(51) Int. Cl.
*G09F 13/00* (2006.01)

(52) U.S. Cl.
USPC .............................. 40/426; 434/301

(58) Field of Classification Search
None
See application file for complete search history.

(56) References Cited

U.S. PATENT DOCUMENTS

| | | | |
|---|---|---|---|
| 2,220,049 A * | 10/1940 | Dunmore | 40/426 |
| 3,550,316 A | 12/1970 | Macpherson | |
| 3,919,795 A | 11/1975 | Van Horne Jinivisian et al. | |
| 4,011,674 A | 3/1977 | Jacobson | |
| 4,012,038 A | 3/1977 | Brotz | |
| 4,192,563 A | 3/1980 | Levkovitch | |
| 4,250,659 A * | 2/1981 | Ishiguro | 446/133 |
| 4,723,233 A * | 2/1988 | Beebe | 368/76 |
| 5,052,968 A * | 10/1991 | Lodrick, Sr. | 446/134 |
| 5,137,487 A | 8/1992 | Hall, Jr. | |
| 5,232,105 A | 8/1993 | Gregg | |
| 5,589,721 A | 12/1996 | Han et al. | |
| 5,642,871 A * | 7/1997 | Repert et al. | 248/686 |
| 5,695,344 A | 12/1997 | Tomasello | |
| 6,250,798 B1 | 6/2001 | Brainard et al. | |
| 6,853,283 B1 | 2/2005 | French | |
| 6,937,125 B1 | 8/2005 | French | |
| 7,260,906 B1 | 8/2007 | Herbstritt | |
| 2002/0064416 A1 | 5/2002 | Varner et al. | |
| 2002/0148147 A1 | 10/2002 | Francis | |

* cited by examiner

*Primary Examiner* — Joanne Silbermann
(74) *Attorney, Agent, or Firm* — Baker Botts L.L.P.

(57) ABSTRACT

A rotation apparatus includes at least one magnet, and a flexible suspension coupled to the at least one magnet or to a moveable object. The at least one magnet is suspended from the suspension directly or via the moveable object. Moreover, when the flexible suspension causes rotation in a first direction via a force, the at least one magnet alternately rotates in the first direction and in a second direction opposite the first direction.

4 Claims, 6 Drawing Sheets

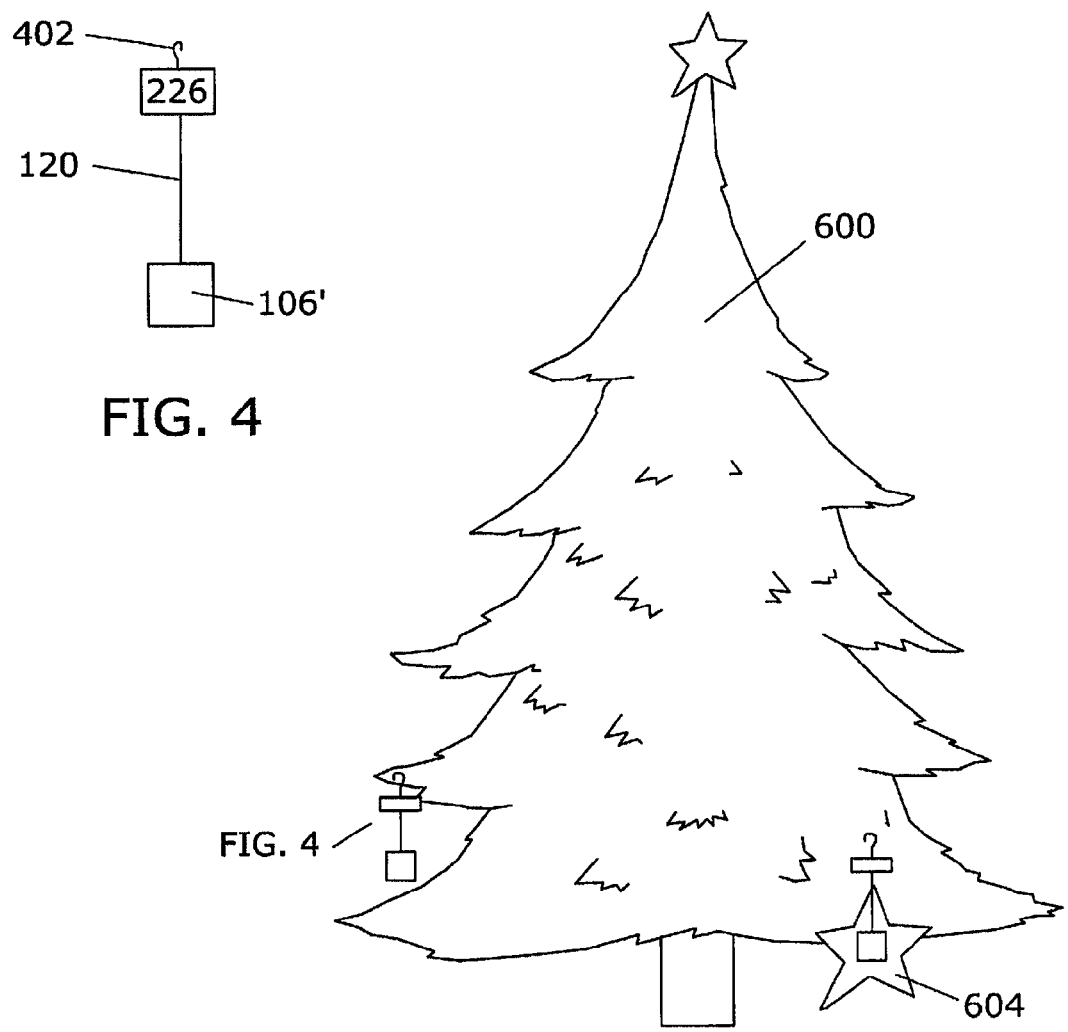

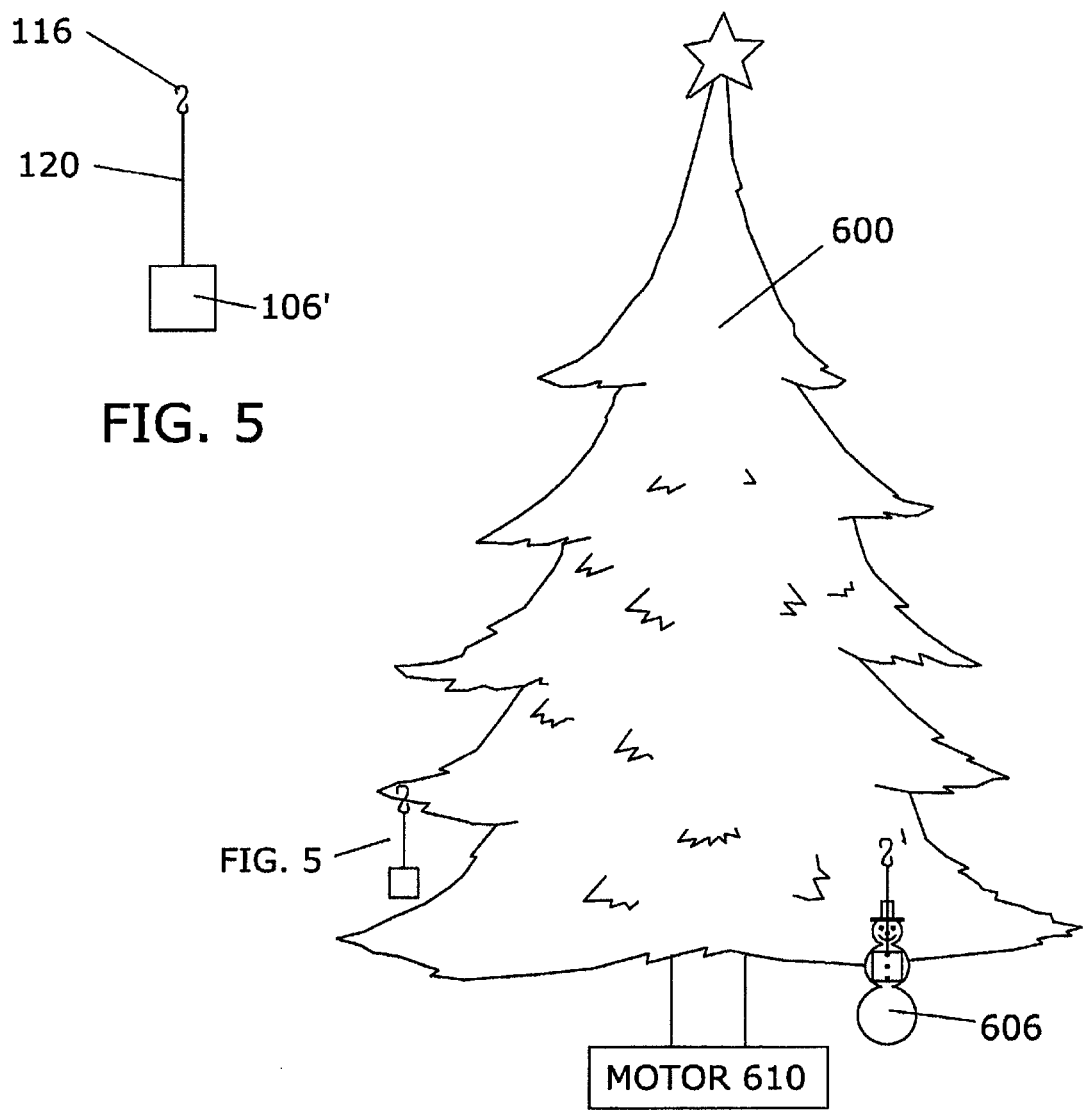

ROTATIONAL DISPLAYS

CROSS-REFERENCE TO RELATED APPLICATIONS

This application is a divisional of U.S. patent application Ser. No. 12/368,706, filed Feb. 10, 2009, the disclosure of which is incorporated herein by reference in its entirety.

BACKGROUND OF THE INVENTION

1. Field of the Invention

The present invention relates generally to rotation apparatus for teaching principles of science, and for use as displays for commercial and non-commercial purposes. In particular, the present invention is directed toward displays that produce reverse-rotation motion or variable speed of rotating parts, or both.

2. Description of Related Art

A known, reverse-rotation motion display uses rare earth magnets, such as neodymium and samarium cobalt, to generate reverse-rotation motion. Nevertheless, such rare earth magnets are more expensive than magnets that are not rare earth magnets, which increases the cost of manufacturing the display.

Another known display uses a motor that alternates the direction of rotation at regular intervals to alternate the direction in which the display rotates. Nevertheless, a motor that alternates the direction of rotation is more expensive than a motor that rotates in a single direction, which increases the cost of manufacturing the display.

SUMMARY OF THE INVENTION

Therefore, a need has arisen for rotation apparatus for teaching principles of science, and for other purposes, which overcome these and other shortcomings of the related art. A technical advantage of the present invention is that rare earth magnets may not be included in a display. Another technical advantage of the present invention is that a motor may not be included in the display.

According to an embodiment of the present invention, a rotation apparatus for teaching principles of science comprises a motor, and a shaft coupled to the motor, in which the motor is configured to rotate the shaft in a first direction. The rotation apparatus also comprises a frame member, and means for coupling the frame member to the shaft, such that the frame member is suspended from the shaft, wherein the means for coupling comprises a flexible suspension. Moreover, the rotational apparatus comprises at least one non-rare earth magnet coupled to the frame member. When the motor rotates the shaft in the first direction the at least one non-rare earth magnet causes the frame member to alternately rotate in the first direction and in a second direction opposite the first direction.

According to another embodiment of the present invention, a rotation apparatus for teaching principles of science comprises a frame member, and a flexible suspension coupled to the frame member, in which the frame member is suspended from the flexible suspension. The rotational apparatus also comprises at least one magnet coupled to the frame member. When the flexible suspension rotates in a first direction via a force independent from a motor, the at least one magnet causes the frame member to alternately rotate in the first direction and in a second direction opposite the first direction.

According to yet another embodiment of the present invention, a rotation apparatus for teaching principles of science comprises at least one magnet, and a flexible suspension coupled to the at least one magnet, in which the at least one magnet is suspended from the flexible suspension. When the flexible suspension rotates in a first direction via a force, the at least one magnet alternately rotates in the first direction and in a second direction opposite the first direction.

According to still another embodiment of the present invention, a rotation apparatus for teaching principles of science comprises an object, and a flexible suspension coupled to the object, in which the object is suspended from the flexible suspension. The rotation apparatus also comprises at least one magnet coupled to the object. When the flexible suspension rotates in a first direction via a force, the at least one magnet causes the object to alternately rotate in the first direction and in a second direction opposite the first direction.

BRIEF DESCRIPTION OF THE DRAWINGS

For a more complete understanding of the present invention, the needs satisfied thereby, and the features and technical advantage, thereof, reference now is made to the following descriptions taken in connection with the accompanying drawings.

FIG. 4 is a view of a motor-operated display, according to an embodiment of the present invention.

FIG. 5 is a view of a display with no motor, according to an embodiment of the present invention.

FIG. 6A is a perspective of a tree with several displays, according to an embodiment of the present invention.

FIG. 6B is a perspective of a rotating tree that rotates several displays, according to an embodiment of the present invention.

DETAILED DESCRIPTION OF EMBODIMENTS

Embodiments of the present invention and their features and technical advantages may be understood by referring to FIGS. 1A-6B, like numerals being used for like corresponding portions in the various drawings.

Figure 1A:
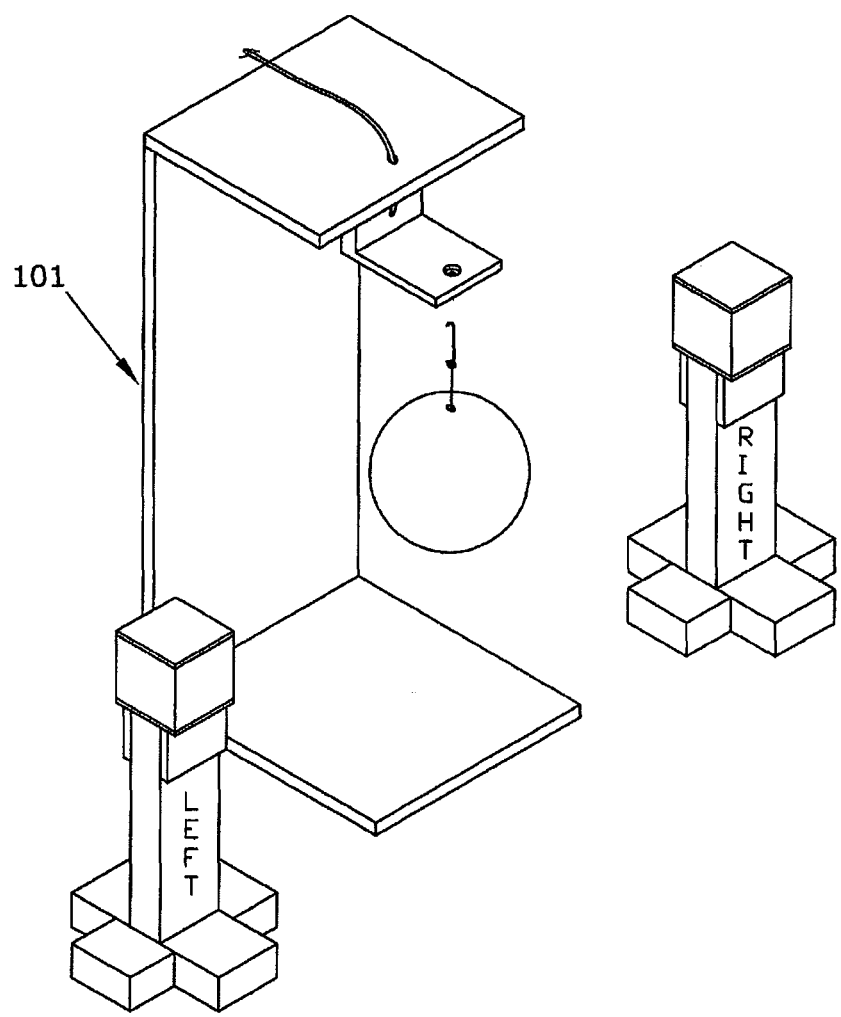
FIG. 1A is a perspective view of an object suspended in a portable stand along with RIGHT and LEFT side stands, according to an embodiment of the present invention.
Figures 1B, 1C, 1D:
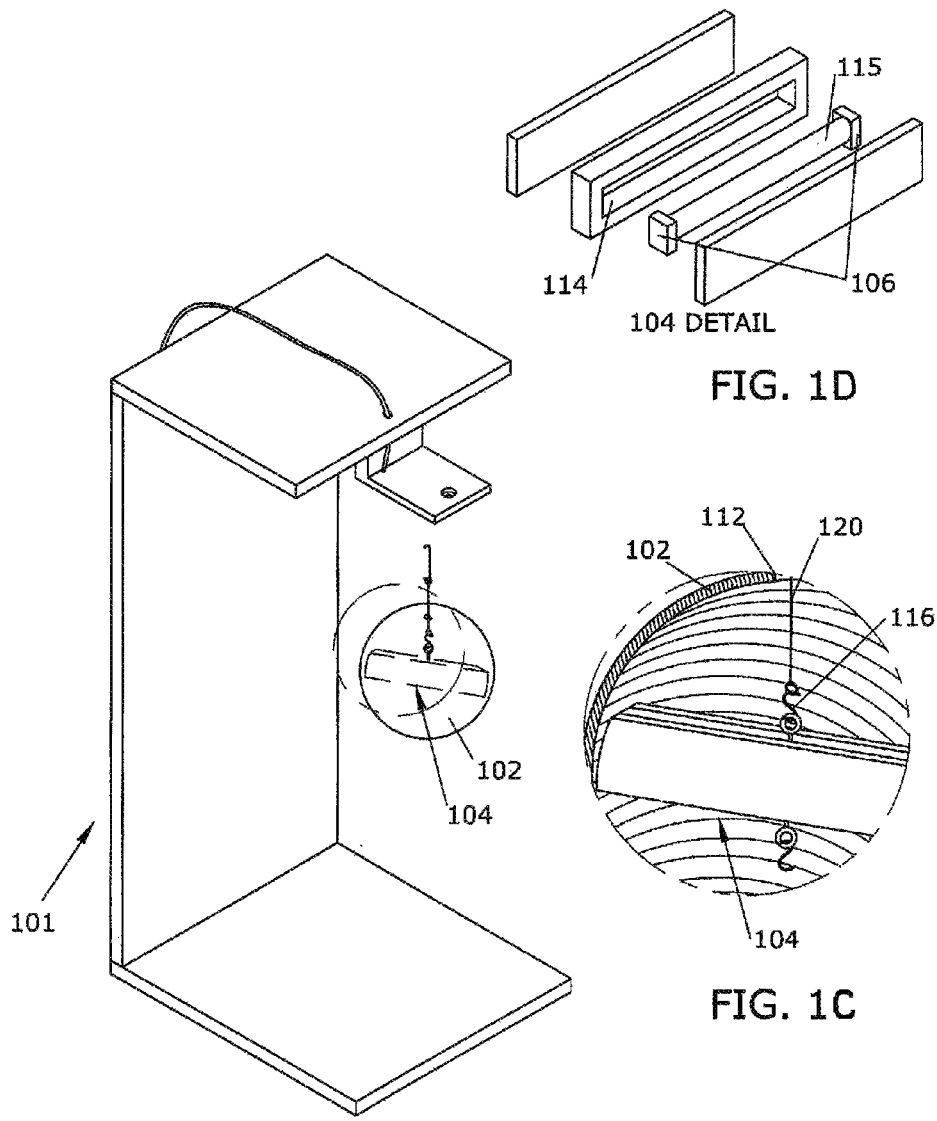
FIG. 1B is a perspective view of an object suspended in the portable stand, according to an embodiment of the present invention.
FIG. 1C is an expanded view.
FIG. 1D is a detail view.
Figure 2:
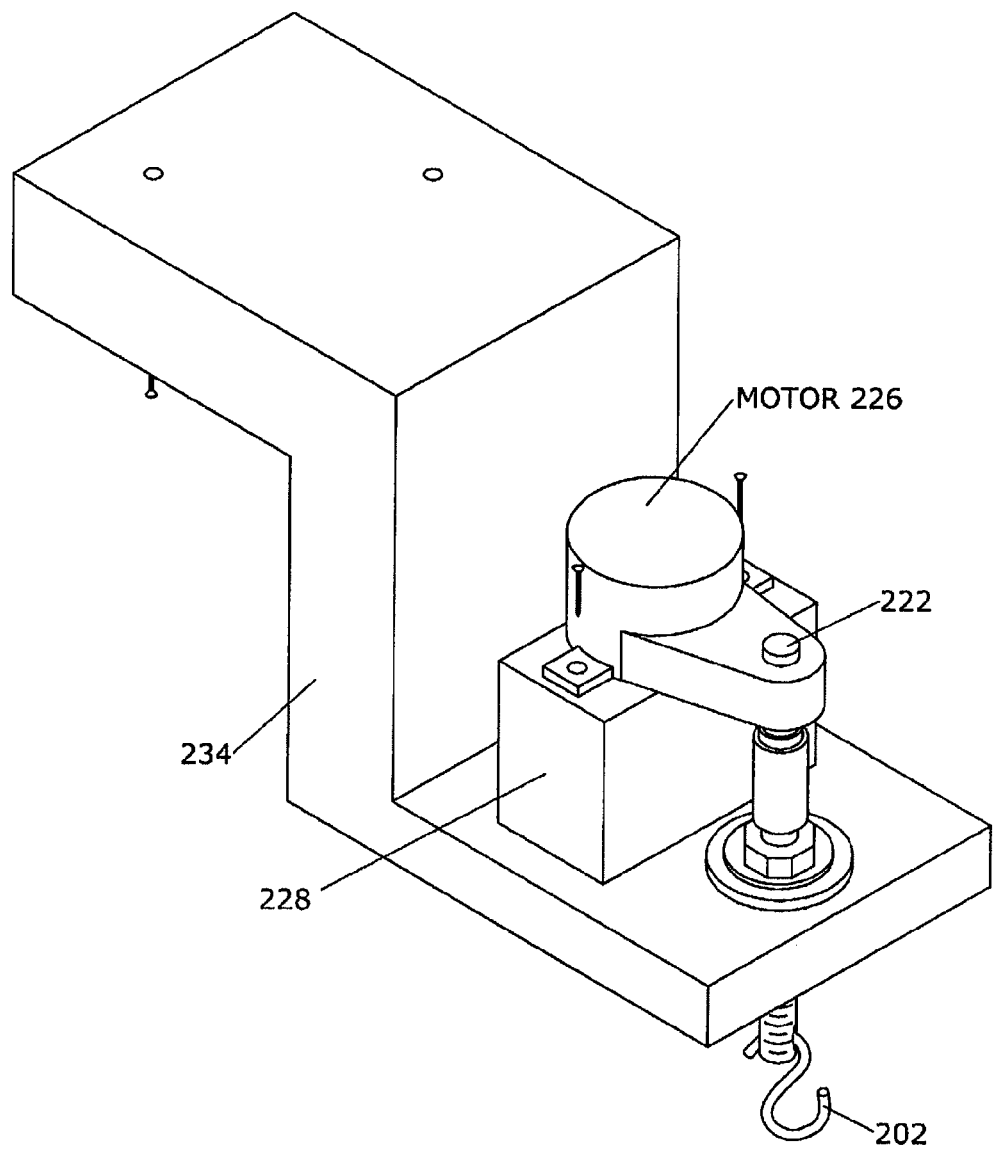
FIG. 2 is a perspective view of a motor assembly, according to an embodiment of the present invention.

Referring to FIGS. 1A-2, a rotation apparatus for teaching principles of science, according to an embodiment of the present invention, may comprise a motor 226, and a shaft 222 which is coupled to motor 226. In operation, motor 226 may be configured to rotate shaft 222 in a single, predetermined direction. The rotation apparatus also may comprise a frame member 104, such as a non-magnetic frame member, e.g., a frame member comprising wood, or a magnetic frame member, e.g., a frame member comprising magnetic steel, and means for coupling frame member 104 to shaft 222. For example, the means for coupling may comprise a flexible suspension 120, a first hook 202 connected to each shaft 222 and flexible suspension 120, and a second hook 116 coupled to each of flexible suspension 120 and frame member 104, such that frame member 104 is suspended from shaft 222. Moreover, the rotation apparatus may comprise at least one magnet 106, e.g., a pair of magnets 106, such as at least one non-rare earth magnet, e.g., a pair of non-rare earth magnets, or at least one rare earth magnet, coupled to frame member 104. For example, each magnet 106 may be connected to a magnetic steel tube member 115 and may be disposed within an opening 114 formed in frame member 104. In addition, each magnet 106 may have a north pole seeking end and a south pole seeking end, and magnets 106 may be positioned within opening 114; such that the north pole seeking end of each magnet 106 is aligned with the north pole seeking end of the other magnet 106.

The rotation apparatus also may comprise an object coupled to frame member 104. For example, the object may comprise a ball 102, a flywheel (not shown), a crystal (not shown), an article of clothing (not shown), or the like. In an embodiment, frame member 104 may be positioned within the object, such that frame member 104 is not visible to a person viewing the object. Moreover, the rotation apparatus may comprise a stand 101, and a support 234 connected to an upper portion of stand 101. In operation, motor 226 may be coupled to shaft 222 and positioned through an opening formed in support 234. At the bottom of shaft 222, hook 202 may be connected to suspension 120, which may enter ball 102 by way of hole 112. At the bottom of suspension 120, hook 116 may connect frame 104 to the suspension. The rotation apparatus further may comprise a pair of side stands, such as a pair of non-magnetic side stands, e.g., a pair of side stands constructed of wood and including pieces of non-magnetic material such as brass, which selectively may be positioned on opposite sides of stand 101, such that stand 101 is positioned between the side stands.

In operation, when motor 226 is activated, motor 226 causes shaft 222 to rotate in the single, predetermined direction at a substantially constant speed. Frame member 104 initially may remain at rest, and subsequently may begin to rotate in the single, predetermined direction, and the rotation of frame member 104 causes the object to rotate in the single, predetermined direction. Nevertheless, subsequently, magnet(s) 106 cause frame 104 and the object to alternatively rotate in the predetermined direction, and a direction opposite the predetermined direction. Moreover, although shaft 222 rotates at a substantially constant speed, magnet(s) 106 cause the rotational speed of frame member 104 and the object to vary.

When the operation of the above-described rotation apparatus initially is shown to at least one viewer, the side stands may be positioned adjacent to stand 101. Because the at least one viewer is not aware that frame 104 is positioned within the object, the at least one viewer may conclude that the side stands are causing the object to rotate in alternating directions. Nevertheless, the operator of the rotation apparatus subsequently may remove the side stands. The at least one viewer then may be confused as to why the object is rotating in alternating directions, and may become more open to learning about the principles governing the rotation of the object, which increases a likelihood of gaining an understanding of such principles. In addition, those of ordinary skill in the art readily will understand that the rotating apparatus may comprise any number of frame members 104 and corresponding objects. For example, such a rotating apparatus may comprise multiple frame members 104 and multiply, corresponding objects.

Figure 3A:
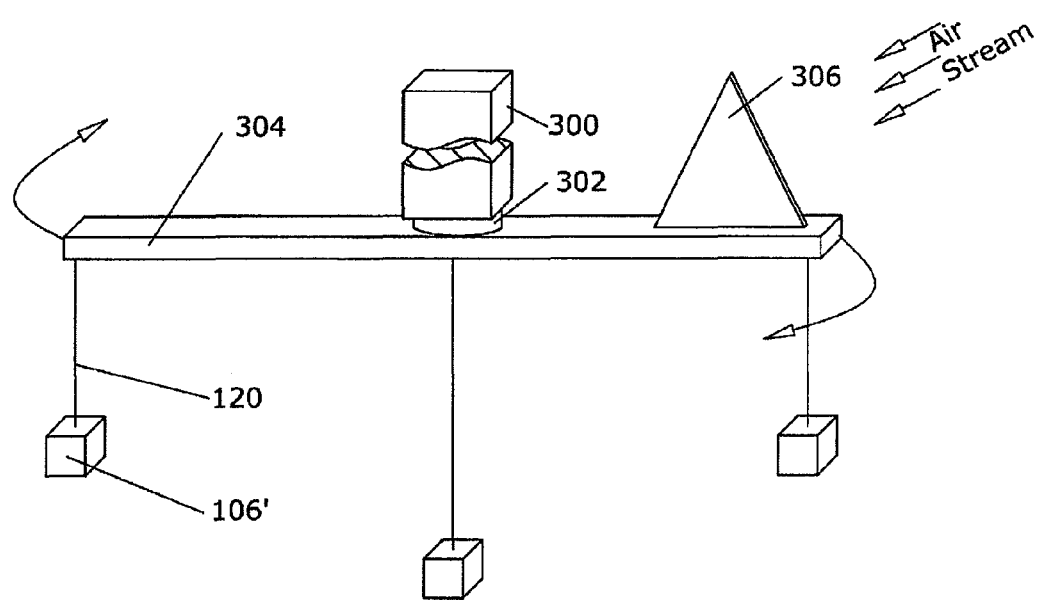
FIGS. 3A and 3B are perspective views of displays that do not include a motor, according to embodiments of the present invention.

Nevertheless, referring to FIG. 3A, in an embodiment of the present invention, torsion may be applied to a suspension without a motor. For example, forces external to a display apparatus may be used. Examples of such external forces are magnetic fields other than the Earth's magnetic field, and air currents. One exemplary type of motion may be referred to as a magnetic cushion. Any display that is subjected to an opposing external magnet field that is comparable to or stronger than its own may result in its frame being abruptly kicked back. Moreover, displays having rectangular frames may provide more reverse-rotation motion from air currents than displays having frames with other shapes, such as frames having circular volumes, e.g., a sphere or a cylinder, because air currents slip around such surfaces. As such, in this embodiment, ball 102 may be eliminated, and an object having a shape substantially corresponding to the shape of frame 104 may be used.

In FIG. 3A, frame 304 rotates by way of a bearing 302 and a support 300. Three suspensions 120 and three magnets 106' are shown in FIG. 3A, and magnets 106' produce torsion in suspensions 120. Nevertheless, one or more magnets may be sufficient to cause reverse-rotation motion. A sail 306, in cooperation with an AIR STREAM, may cause frame 304 to always move in the same direction. Nevertheless, magnet(s) 106' may, periodically, rotate in a reverse direction owing to torsion(s) in suspension(s) 120.

Figure 3B:
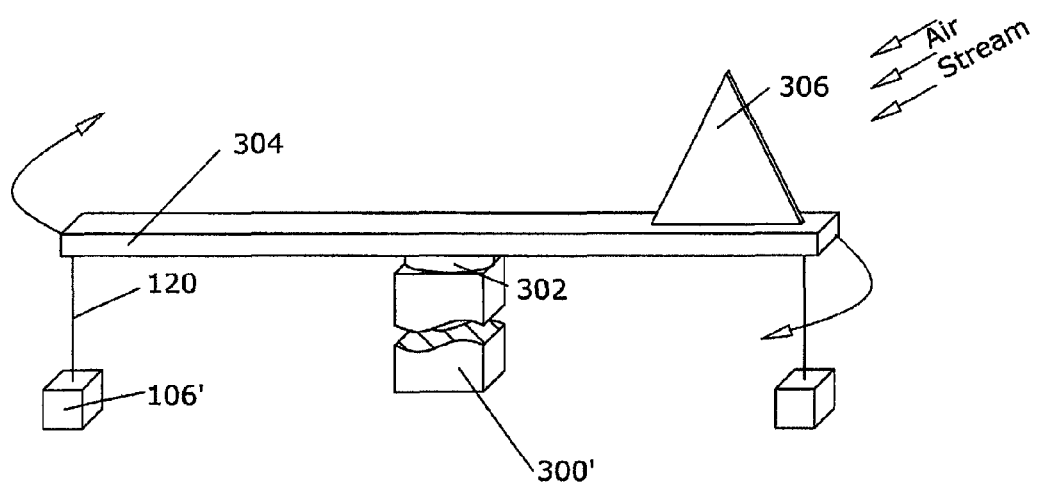

FIG. 3B is substantially the same as FIG. 3A, except that the manner in which frame 304 is attached is different. In FIG. 3A, support 300 holds frame 304 from above, and in FIG. 3B, a support 300' holds frame 304 from below. Both the display of FIG. 3A and the display of FIG. 3B may produce similar results, and may comprise one or a plurality of magnets 106'.

Both the display of FIG. 3A and the display of FIG. 3B may produce similar results. For example, the following guidelines may be followed:
a) when no air currents are present, a display may not rotate without motor power;
b) when sufficient air currents are available, e.g., forced air coming from a heating and air conditioning outlet or air coming from an open window, a display may not need a motor;
c) a display which operates without a motor may be suspended from an appropriate attachment point; and
d) strong air currents disturb a display's orderly rotation, and as such, should be avoided.

Referring to FIG. 4, in another embodiment of the present invention, a display may comprise a motor, a suspension, and a magnet. In this embodiment, no frame may be included, and the display may rotate in substantially a similar manner as a display which comprises frame 104. The display of FIG. 4 also may comprise a hook 402, a motor 226, a suspension 120, and a magnet 106'. Motor 226 may be operated from a battery, or from an electrical outlet.

Referring to FIG. 5, in yet another embodiment of the present invention, the display may be further simplified and may comprise a suspension and a magnet, provided that, as set forth above, an alternative source of rotation is available. In this embodiment, the suspension may be positioned at a point midway between the pole surfaces of the magnet, such that the magnet serves as a frame. FIG. 5, shows hook 116, suspension 120, and magnet 106'.

Referring to FIG. 6A, in yet another embodiment of the present invention, a display may comprise a stationary object, such as tree 600, and one or more FIG. 4 combinations. A movable object, such as star 604 may reverse rotate as a result of forces from motor 226, suspension 120, and magnet 106'.

Referring to FIG. 6B, in yet another embodiment of the present invention, a display may comprise an object, such as tree 600 positioned on motor 610, and one or more FIG. 5 combinations. Snowman 606 may comprise a FIG. 5 display. Multiple individual displays may reverse rotate using the approach of FIG. 6B, and all of them may operate as a result of the rotation of motor 610. Therefore, the individual displays, like FIG. 5, may not include a motor.

The embodiments of the present invention may produce rotational characteristics that result from the parameters selected. Several fundamental characteristics associated with these displays may comprise:

Time required for a display, after being turned on, to complete the initial 360° of rotation.

Time required to reverse the direction of rotation.

Maximum speed in the forward, and reverse, directions.

Total time to repeat the motion that constitutes one display cycle.

Empirical results showed that displays may operate in a first and second direction at motor speeds which are less than 1 and up to motor speeds which are greater than 100 rpm.

While the invention has been described in connection with exemplary embodiments, it will be understood by those skilled in the art that other variations and modifications of the exemplary embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being indicated by the flowing claims.

What is claimed is:

1. A rotation apparatus comprising:
   a moveable object;
   a flexible suspension coupled to the moveable object, wherein the moveable object is suspended from the flexible suspension; and
   at least one magnet coupled to the moveable object, wherein, when the flexible suspension causes rotation in a first direction via a non-magnetic force, the at least one magnet applies a magnetic force to the moveable object to alternately rotate the moveable object in the first direction and in a second direction opposite the first direction.

2. The rotational apparatus of claim 1, wherein the non-magnetic force is independent of a motor.

3. The rotational apparatus of claim 1, wherein the at least one magnet is a non-rare earth magnet.

4. A rotation apparatus comprising:
   at least one magnet; and
   a flexible suspension directly coupled to the at least one magnet, wherein the at least one magnet is suspended from the suspension, and wherein, when the flexible suspension causes rotation in a first direction via a non-magnetic force, the at least one magnet imparts a magnetic force to alternately rotate the at least one magnet, in response to the magnetic force of the at least one magnet, in the first direction and in a second direction opposite the first direction.

\* \* \* \* \*